United States Patent [19]

McCarthy

[11] 4,042,077
[45] Aug. 16, 1977

[54] CALIPER DISC BRAKE OR THE LIKE
[75] Inventor: Richard H. McCarthy, West Allis, Wis.
[73] Assignee: FMC Corporation, San Jose, Calif.
[21] Appl. No.: 709,555
[22] Filed: July 28, 1976
[51] Int. Cl.² .................................... B60T 13/04
[52] U.S. Cl. .............................. 188/171; 188/72.3
[58] Field of Search ................ 188/72.3, 170, 171

[56] References Cited
U.S. PATENT DOCUMENTS
3,561,573  2/1971  Allen .................................. 188/171

Primary Examiner—Duane A. Reger
Attorney, Agent, or Firm—A. J. Moore; C. E. Tripp

[57] ABSTRACT

This caliper disc brake is normally held in its engaged position by springs and is released by a solenoid which acts through a lever assembly to activate the plunger of a hydraulic master cylinder unit which directs a measured volume of hydraulic fluid into a brake cylinder during each stroke to release the brake and provide a predetermined brake clearance. Brake wear results in a gradually diminishing volume of fluid within the brake cylinder with the excess fluid displaced therefrom flowing into a reservoir of the master cylinder prior to directing the measured volume of hydraulic fluid into the brake cylinder during the next brake releasing stroke. The cross sectional area of the master cylinder plunger and the brake piston are designed to provide a substantial mechanical advantage, and the lever assembly is fulcrum to provide an additional mechanical advantage thus requiring a much smaller than average power means for releasing the brake.

10 Claims, 7 Drawing Figures

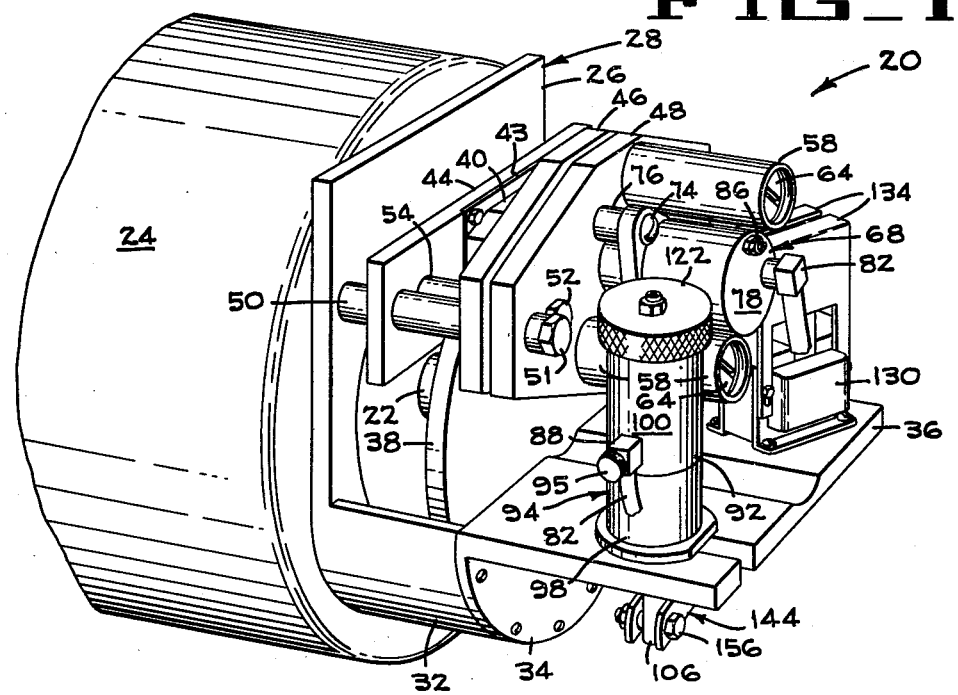
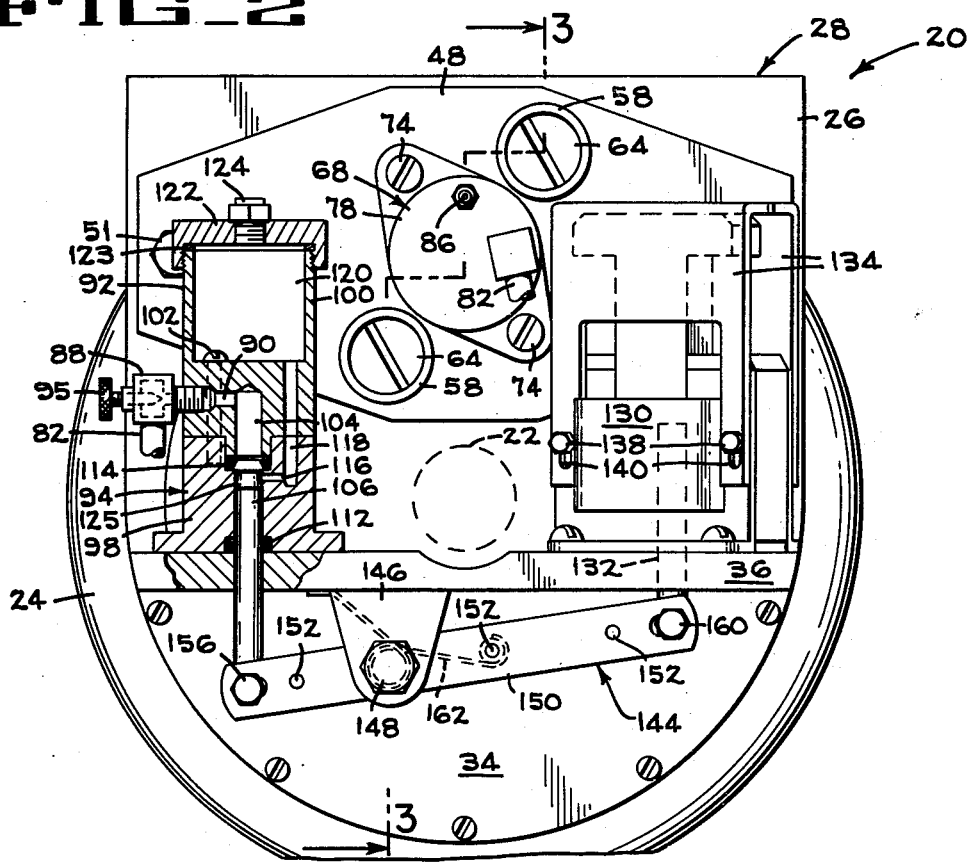

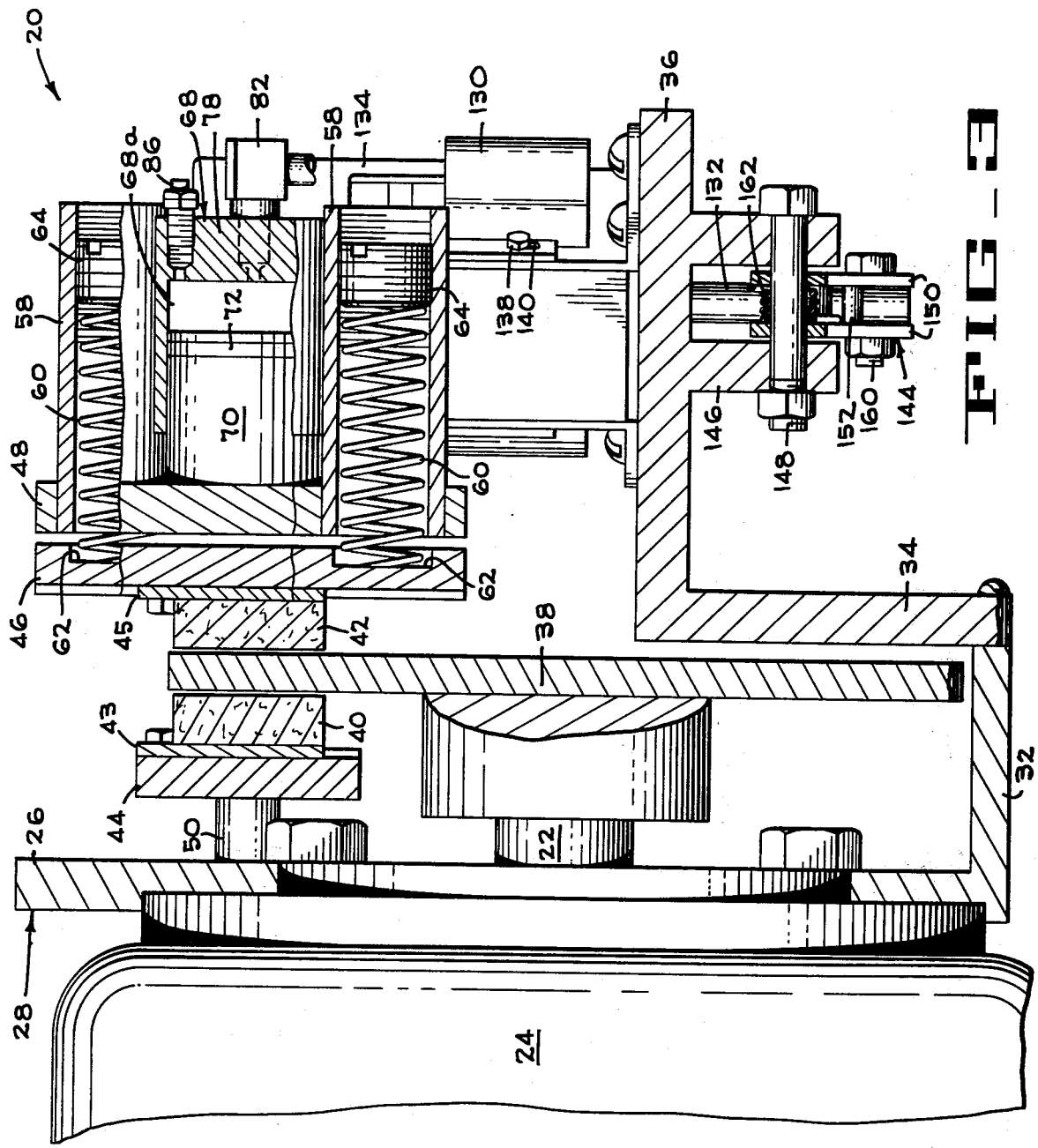

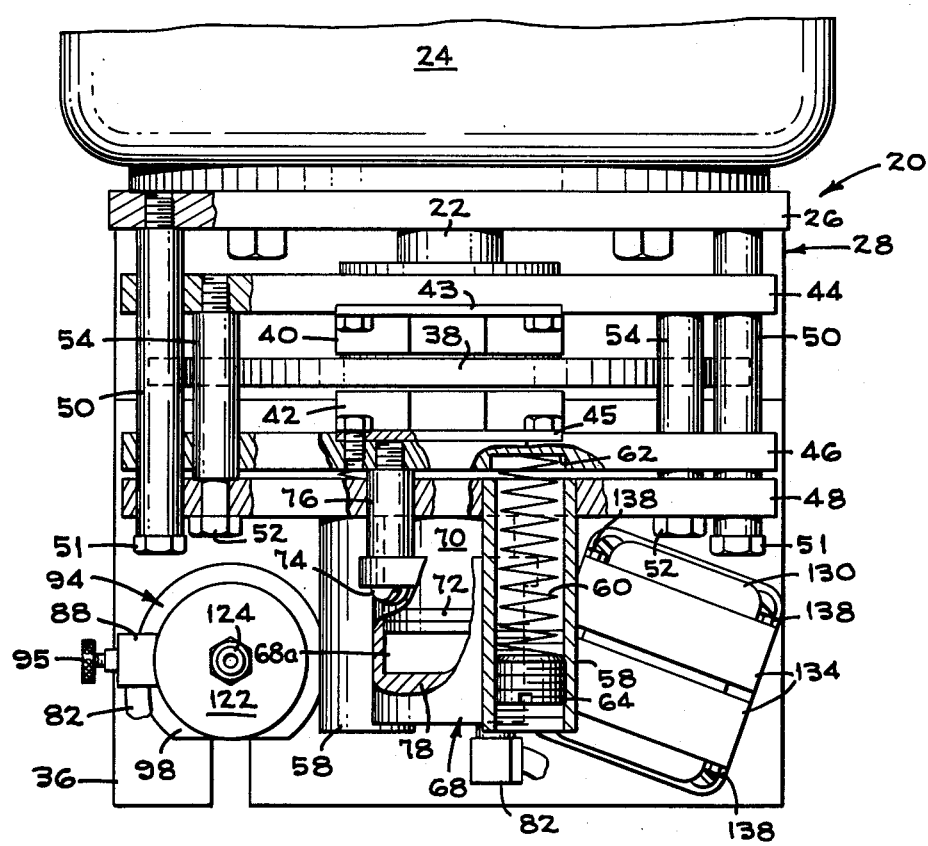
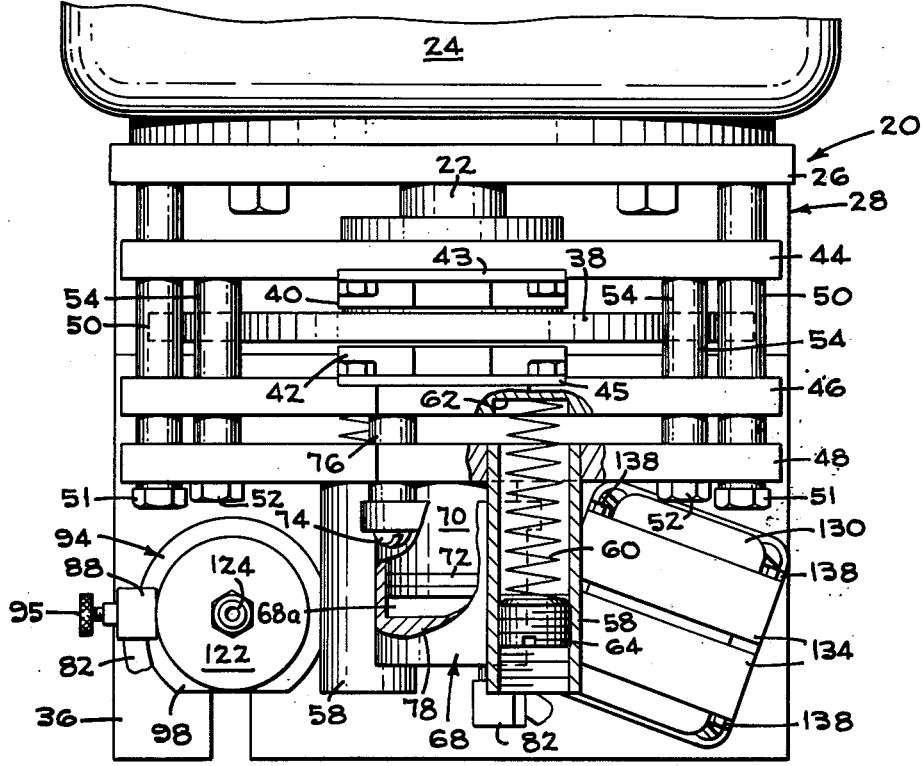

CALIPER DISC BRAKE OR THE LIKE

BACKGROUND OF THE INVENTION

1. Field of the Invention

This invention pertains to disc brakes or the like for motor shafts, equipment shafts or other similar rotating members, and more particularly relates to a brake (or clutches) which may easily be adjusted to maintain a desired braking force when engaged and which maintains a constant clearance between the brake pads and the disc when the brake is released.

2. Description of Prior Art

Hydraulically released, spring set brakes are well known in the art as indicated by U.S. Pat. No. 3,456,767 which issued to Hollnagel et al. on July 22, 1969. Although this patent discloses a disc brake which is hydraulically released, it does not disclose any means for maintaining a constant clearance or gap between the brake pads and the disc when the brake is hydraulically released but instead allows the clearance gap to increase as the pads wear.

U.S. Pat. No. 3,63*,715 which issued to Burnett on Jan. 11, 1972 discloses a disc brake actuator which utilizes a deformable annular seal between a piston and cylinder to assure that the friction pads retract a sufficient distance from the rotor disc despite wear of the friction material. In addition to the deformable annular seal, the patentee discloses a nut which is rotated on a threaded member in response to an abnormally long stroke of the piston thereby correcting the stroke of the piston to provide the desired gap when released.

The United States patents to Airheart et al. U.S. Pat. No. 3,113,646 which issued on Dec. 10, 1963; and Dotto U.S. Pat. No. 3,064,765 which issued on Nov. 20, 1962 each disclose another type of device for assuring a desired gap between the disc brake rotor and the friction pads when the brake is released. In both of these patents when the gap becomes excessive due to wear of the friction pads, sufficient hydraulic force is applied to overcome the frictional grip between a shaft and a friction washer or the like thereby repositioning the shaft relative to the washer and support housing thereby re-establishing the desired gap.

SUMMARY OF THE INVENTION

The caliper disc brake of the present invention is a spring set, hydraulically released system. A hydraulic brake piston and cylinder assembly is provided to release the brake upon application of sufficient fluid pressure to overcome the spring braking force. As wear occurs on the friction pads, the volume of hydraulic fluid which may be accommodated within the headspace of the brake cylinder decreases. As the brake pads wear, the excess hydraulic fluid is directed through the cylinder and into a reservoir of a positive displacement master piston and cylinder unit. When it is desired to release the brake, power means such as a solenoid is activated to move the piston of the master cylinder through a predetermined stroke. At the start of the stroke of the piston or plunger, the reservoir is in flow communication with the cylinder thus permitting the excess fluid from the brake cylinder to be directed into the reservoir as brake wear occurs. Continued movement of the master cylinder plunger through its brake releasing stroke then seals the master cylinder from the reservoir passage thus forcing a predetermined volume or hydraulic fluid into the brake piston and cylinder assembly. The predetermined amount of fluid entering the brake cylinder per stroke is sufficient to release the brake and provide a predetermined gap between the disc brake rotor and the brake pads. Since the same amount of fluid is pumped into the brake piston and cylinder assembly during each brake releasing stroke of the plunger of the master cylinder unit, the predetermined gap remains the same regardless of the degree of brake wear.

A flow control valve or the like may be placed in the flow passage for controlling the rate of engagement and disengagement of the brake. In order to minimize the power output requirement of the power means, the power means preferably operates the plunger of the master cylinder through a lever system which is pivoted so as to provide a mechanical advantage, and the relative cross sectional areas of the plunger of the master cylinder and the brake piston are likewise designed to provide significant mechanical advantage.

BRIEF DESCRIPTION OF THE DRAWINGS

FIG. 1 is a perspective view illustrating the caliper disc brake of the present invention mounted on a fragment of a motor.

FIG. 2 is an enlarged end elevation of the disc brake of FIG. 1, certain parts being cut away and others being shown in section.

FIG. 3 is a vertical section taken along lines 3—3 of FIG. 2.

FIG. 4 is an enlarged section of a fragment of the master cylinder illustrating the plunger at the bottom of its stroke.

FIG. 5 is a plan of the apparatus of FIG. 2 showing the brake in a disengaged position, certain parts being cut away and others being shown in section.

FIG. 6 is a plan view similar to FIG. 5, showing the brake disengaged but after considerable wear has occurred on the friction pads.

FIG. 7 is a horizontal section taken through a portion of an alternate embodiment of the master-cylinder assembly.

DESCRIPTION OF THE PREFERRED EMBODIMENT

The caliper disc brake 20 (FIGS. 1 and 2) of the present invention is provided to selectively stop or permit rotation of a shaft 22 of any suitable piece of equipment such as a motor 24 as illustrated in FIG. 1. The shaft 22 projects through an end plate 26 of a frame 28 that is bolted to the housing of the motor. The frame also includes a cylindrical segment 32 to which an end plate 34 and support plate 36 are rigidly secured.

A disc brake rotor 38 (FIGS. 3 and 5) is rigidly secured to the shaft 22 with its lower portion projecting within the cylindrical segment 32 and with its upper portion projecting between two friction pads 40 and 42. The friction pad 40 is secured to a bracket 43 that is bolted to a front plate 44, while the friction pad 42 is secured to a bracket 45 that is bolted to a back plate 46. The front plate 44, back plate 46, and a spring guide plate 48 are slidably received on tubular spacers 50 which are secured to the end plate 26 by elongated cap screws 51 extending therethrough. The front plate 44 and spring guide support plate 48 are rigidly connected to and spaced a predetermined distance from each other by capscrews 52 which extend through tubular spacers 54 upon which the back plate 46 is slidably received.

A pair of tubular spring guides 58 are secured to the spring guide support plate 48 and receive torque control, helical compression springs 60 (FIGS. 3 and 5) disposed between counter bores 62 in the back plate 46 and torque adjusting screws 64 threaded into the free ends of the tubular spring guides. The screws 64 have screw driver slots or the like therein so that they may easily be adjusted to provide the desired braking or rotation resisting torque.

A main brake cylinder assembly 68 (FIGS. 1, 3 and 5) having a piston 70 slidably received therein and sealed thereto by an O-ring 72 is rigidly secured to the back plate 46 by cap screws 74 received within tubular spacers 76 (FIG. 5). The spring guide supporting plate 48 is slidably received on the spacers 76 and is disposed in abutting engagement with the free end of the piston 70. The head 78 of the cylinder 68 is provided with a threaded port which receives one end of a conduit 82 for accommodating flow of hydraulic fluid into and out of the cylinder 68. Another threaded port in the cylinder head 78 receives a bleeder plug 86 (FIG. 3) so that all air may be bled from the headspace 68a within the cylinder assembly 68 and remainder of the hydraulic system prior to placing the brake in operation.

The other end of the conduit 82 is provided with a conduit fitting 88 which is screwed into a port 90 (FIGS. 2 and 4) of the cylinder 92 of a master piston and cylinder unit 94. The conduit fitting 88 may include an adjustable flow control valve 95 if it is desired to control the rate of engagement and/or disengagement of the brake, or the fitting may merely be an elbow if no speed control is necessary.

The master cylinder unit 94 includes the cylinder 92 which comprises a flanged base 98 that is bolted to the support plate 36 of the frame 28 in alignment with a hole therein. A body portion 100 of the cylinder 92 is connected in fluid tight relationship with the base 98 by capscrews 102. The base 98 and body portin 100 are bored to provide a cylinder chamber 104 which communicates with the port 90 and slidably receives a master cylinder piston or plunger 106. The base 98 is provided with counter bores having chevron type dynamic fluid seals 112 and 114 therein to prevent leakage of hydraulic fluid therepast when in engagement with the plunger 106.

When the plunger 106 is in its retracted position as illustrated in FIGS. 2 and 4, a pair of passages 116 and 118 in the base 98 and body portion 100 establish flow communication between the chamber 104 and a hydraulic fluid reservoir 120 formed in the body portion 100. The reservoir 120 is partially filled with hydraulic fluid to provide a constant supply of fluid for the hydraulic system during operation. A cap 122 with a suitable gasket 123 is screwed on the upper end of the reservoir 120 and has a spring loaded relief valve 124 therein for preventing pressure build up within the reservoir due to brake pad wear which causes additional fluid to enter the reservoir as discussed below.

As illustrated in FIGS. 2 and 4, an upper rounded or beveled end 125 of the plunger 106 permits fluid to more easily flow into the reservoir 120 through passages 116 and 118 when the plunger 106 is in its retracted position. Once the plunger has moved upwardly a sufficient distance to close the passage 116 and becomes disposed in sealing engagement with the dynamic seal 114, the remaining upward portion of the stroke of the plunger 106 will displace a measured volume of hydraulic fluid from the cylinder 92.

The rounded or beveled end of the plunger permits easy entrance into the chevron type seal. This configuration also requires the least amount of upward travel of the plunger to cover the passage 116 and to enter and become sealed within the chevron seal. This provides a minimum of lost motion of the plunger.

In response to the above described stroke of the plunger 106, an equivalent volume of hydraulic fluid is caused to enter the brake cylinder 68 (FIGS. 3 and 5) moving the piston 70 and cylinder 68 with respect to each other a distance proportional to the stroke of plunger 106, thus releasing the brake and providing a predetermined gap between the rotor 38 and each friction pad 40, 42. A total clearance or gap of about 0.018 of an inch (or 0.009 of an inch between each friction pad and the rotor) has been found to be suitable when the rotor is about 8 inches in diameter.

It will be appreciated that a considerable mechanical advantage is achieved by providing the master cylinder plunger 106 with a small cross-sectional area as compared to the cross-sectional area of the brake piston 70. In the illustrated embodiment this area difference achieves about a 22 to 1 mechanical advantage thus requiring about 1/22nd of the power from the power means as would be required with a system where the areas of the plunger 106 and brake piston 70 are identical.

The drive means or power source for the plunger 106 (FIGS. 2 and 3) is illustrated as a solenoid 130 which is bolted to the frame support plate 36 and has the lower portion of its solenoid plunger 132 projecting through a bushed opening in the support plate 36. A pair of angle abutment or stop brackets 134 are connected to the body of a solenoid by bolts 138 which extend through slots 140 in the plates 134. The angle brackets 134 include abutment surfaces which are engaged by the upper end of the solenoid plunger 132 when in its uppermost de-energized position. Thus, the adjustable brackets 134 serve to limit the stroke of the plunger 132 and determine the solenoid air gap.

A lever assembly 114 is pivotally connected to a yoke 146 projecting downwardly from the support plate 36 having a pivot bolt 148 extending therethrough. The lever assembly includes a pair of parallel bars 150 that are rigidly held in spaced parallel relationship by spacer rivets 152. One end portion of each bar 150 is slotted to slidably receive a pivot bolt 156 which extends through the slots and through a hole in the lower end portion of the master cylinder plunger 106. The other end portions of the bars 150 are likewise slotted to slidably receive a pivot bolt 160 which extends through the slots and through a hole in the lower end portion of the solenoid plunger 132. A torsion spring 162 is wound around the pivot bolt 148 and has one end bearing against the support plate 36 and the other end connected to one of the spacer rivets 152 to normally hold the lever assembly 144 and plungers 106 and 132 in the illustrated brake engaging position of FIG. 2.

When the solenoid 130 is energized, the solenoid plunger 132 moves downwardly until the solenoid air gap is closed thereby raising the master cylinder plunger through its full brake releasing stroke as indicated in dotted lines in FIG. 4. It will be noted that the pivot point of the lever assembly 144 (FIG. 2) is positioned to provide a 2:1 mechanical advantage thus further reducing the amount of power required to release the brake with the total mechanical advantage of the illustrated embodiment being about 44 to 1. It will be understood, however, that the location of the pivot point of the lever assembly 144; and the relative areas of the master plunger and brake piston may be varied to increase or decrease the mechanical advantage as determined by the particular parameters under which the brake is to be operated. It is also to be understood that the size of the chamber 104 of the master cylinder 92 and the stroke of the plunger 106 may be varied to provide larger or smaller brake gaps when the brake is released.

If it is desired to mount the master piston and cylinder unit 94 in other than its illustrated upright position, for example on its side or inverted, provision must be made for preventing air in the reservoir from entering the hydraulic system. As illustrated in FIG. 7, the repositioned master piston and cylinder unit 94a is identical to that previously described unit 94 except that a piston 170 is inserted in the reservoir 120a and is sealed thereto by a dynamic seal such as an O-ring. A spring 174 is disposed between the cap 122a and the piston 170 and supplies a sufficient force against the piston 170 to maintain the portion of the reservoir to the left (FIG. 7) of the piston 170 filled with hydraulic fluid.

In operation, the reservoir 120 (FIGS. 2 and 5) of the hydraulic system is partially filled with hydraulic fluid and the conduit 82 and brake cylinder 68 are completely filled with liquid with the bleeder valve 86 being used to bleed all of the air from the system. At this time the brake pads 40,42 are in engagement with the rotor 38. The torque adjusting screws 64 are then screwed into or partially out of the tubular spring guide 78 to provide the desired braking torque against the rotor 38. The torque may be adjusted to provide a constant drag on the rotor as may be required when winding or unwinding rolls of film or the like. More frequently, however, the springs 60 are adjusted so as to completely stop the shaft 22 when the brake is engaged.

It will be apparent that release of the brake is accomplished by applying hydraulic force sufficient to compress the springs 60 upon actuation of the brake piston and cylinder assembly 68. Thus, the greater the spring force the greater the power required by the power means or solenoid 130 to compress the springs. Since reduction of the solenoid air cap is effective to increase its power, downward adjustment of the abutment brackets 134 by virtue of the slots 140 and bolts 138 will provide limited adjustment means for varying the power of the solenoid at the beginning of its stroke. It is apparent, however, that the amount of downward movement of the abutment or stop brackets 134 must not be great enough to cause the master cylinder plunger 106 to close the passage 116 to the reservoir when the solenoid is de-energized.

When it is desired to release the brake, the solenoid is energized thereby pivoting the lever assembly 144 clockwise (FIG. 2) until the solenoid air gap is closed. After the master cylinder plunger 106 moves upwardly past the reservoir passage 116 and into sealed engagement with the dynamic seal 114, further upward movement will displace a predetermined volume of hydraulic fluid from the master cylinder 94 and move an equivalent volume of liquid into the headspace 68a of brake cylinder assembly 68 thereby releasing the brake and providing the desired predetermined gap between the rotor 38 and the brake pads 40 and 42.

The solenoid 130 is de-energized when it is desired to again engage the brake. The torque control spring 60 aided by the torsion spring 162 will move the friction pads 40,42 into braking engagement with the rotor 38 and will also reduce the headspace 68a within the brake cylinder assembly 68. As the headspace of the cylinder assembly 68 is reduced, hydraulic fluid is displaced therefrom and flows through conduit 82 back into the master cylinder chamber 104. If no brake wear has occurred, the volume of fluid displaced from the brake cylinder will be equal to that required to fill the chamber 104 in the master cylinder unit 94 with no fluid following through the passages 116 and 118 into the reservoir 120. If desired, the flow control valve 95 may be adjusted to control the rate of flow of hydraulic fluid through the conduit 82 thus providing means for controlling the rate of movement of the friction pads when engaging and/or disengaging the brake.

As the brake pads 40,42 become thinner due to wear during the prolonged use of the brake the headspace 68ai within the brake cylinder assembly gradually diminishes as indicated by a comparison of FIGS. 5 and 6, causing the excess hydraulic fluid to enter other parts of the hydraulic system. This excess fluid flows into the reservoir 120 (FIG. 2) through passages 116 and 118. Since brake wear slowly occurs, the flow into the reservoir during each spring set, brake engaging stroke will be very low. However, long use and substantial wear of the brake pads 40,42 will eventually cause an increase of the liquid level in the reservoir 120 thus compressing the air thereabove. The spring loaded relief valve 124 will relieve this pressure thus preventing the system from becoming pressure locked.

As the thickness of the brake pads 40 and 42 are reduced by wear, the torque applying springs 60 lengthen thus reducing their braking effectiveness. If a substantially constant braking torque is required, the screws 64 are periodically adjusted to maintain the springs at substantially their initially set length as indicated by FIGS. 5 and 6.

Although the master cylinder unit 94, solenoid 130, and lever assembly 144 have been illustrated as being supported on the support plate 36, it is apparent that these components may all be mounted at a location remote from the brake cylinder assembly 68 and may be connected thereto by a longer conduit 82. It is also to be understood that drive means other than a solenoid may be used to reciprocate the plunger 106 of the master cylinder. Other suitable (controlled volume) master cylinder units may be used to actuate the brake cylinder assembly, if desired.

From the foregoing description it is apparent that the caliper disc brake of the present invention is a spring set, power released brake. The brake utilizes both lever means and hydraulic means in such a way as to provide considerable mechanical advantage thus requiring a much smaller power source than would normally be required to release the brake. The brake also includes a brake cylinder assembly which is connected to the friction pads in such a way as to diminish its headspace as the pads are reduced in thickness by wear. The excess hydraulic fluid discharged from the reduced headspace is directed into a master cylinder that diverts the excess into a reservoir. Each brake releasing stroke of the master cylinder plunger first seals the passage to the reservoir and then displaces a predetermined volume of hydraulic fluid into the brake cylinder, which volume is sufficient to release the brake and provide a predetermined gap between the brake pads and the rotor regardless of the degree of wear on the friction pads.

Although the best mode contemplated for carrying out the present invention has been herein shown and described, it will be apparent that modification and variation may be made without departing from what is regarded to be the subject matter of the invention.

What I claim is:

1. Apparatus for controlling torque applied to a rotor mounted for rotation comprising: friction means on each side of the rotor; means mounting each of said friction means for movement relative to said rotor between a position engaging said rotor and a release position disengaged from said rotor by a gap of predetermined size; resilient means operatively connected to said friction means for applying a force sufficient to urge said friction means into one of said positions; a main piston and cylinder assembly for moving said friction means to the other of said positions when a predetermined volume of head-space fluid is forced into said cylinder under a pressure sufficient to overcome the resilient force; and power means operatively connected to said main piston and cylinder assembly for applying said predetermined volume of fluid to said main piston assembly during each pressure applying actuation of said assembly regardless of variations in the headspace capacity of said main piston and cylinder assembly; said power means including a master cylinder unit comprising cylinder walls defining a cylinder chamber communicating with said main piston and cylinder assembly, a plunger mounted for reciprocation in said chamber, a hydraulic reservoir, passage defining means disposed solely within said cylinder walls for establishing communication between said reservoir and said cylinder chamber when said plunger is fully extended relative to said chamber, means connected to said plunger for reciprocating said plunger within said chamber through a predetermined stroke between a fully extended position permitting flow of fluid between said reservoir and said chamber and a retracted position blocking said passage and preventing flow between said reservoir and said chamber, and means for establishing a fluid seal between said chamber and said plunger at a point in said pressure applying stroke which occurs after flow communication between said chamber and said reservoir has been blocked by said plunger for thereafter pumping said predetermined volume of fluid at high pressure into said main piston and cylinder means.

2. An apparatus according to claim 1 wherein said plunger has a cross-sectional area which is much less than that of said piston thereby providing a mechanical advantage which minimizes the power needed to reciprocate said plunger and overcome the resistance of said resilient means.

3. An apparatus according to claim 1 wherein said plunger reciprocating means comprises a solenoid, a lever pivotally connected to said solenoid and to said plunger, and means for pivotally supporting said lever at a fulcrum point disposed between said solenoid and said plunger, said fulcrum point being positioned closer to said plunger than to said solenoid thereby minimizing the force required by said solenoid.

4. Apparatus for controlling torque applied to a rotor mounted for rotation comprising: friction means on each side of the rotor; means mounting each of said friction means for movement relative to said rotor between a position engaging said rotor and a release position disengaged from said rotor by a gap of predetermined size; resilient means operatively connected to said friction means for applying a force sufficient to urge said friction means into one of said positions; a main piston and cylinder assembly for moving said friction means to the other of said positions when a predetermined volume of headspace fluid is forced into said cylinder under a pressure sufficient to overcome the resilient force; and power means operatively connected to said main piston and cylinder assembly for applying said predetermined volume of fluid to said main piston assembly during each pressure applying actuation of said assembly regardless of variations in the headspace capacity of said main piston and cylinder assembly; said power means including a master cylinder unit comprising a cylinder chamber communicating with said main piston and cylinder assembly, a plunger mounted for reciprocation in said chamber, a hydraulic reservoir communicating with said cylinder through passage defining means, means connected to said plunger for reciprocating said plunger within said chamber through a predetermined stroke between a position permitting flow of fluid between said reservoir and said chamber and a position preventing flow between said reservoir and said chamber, means for establishing a fluid seal between said chamber and said plunger at a point in said pressure applying stroke which occurs after flow communication between said chamber and said reservoir has been blocked for thereafter pumping said predetermined volume of high pressure fluid into said main piston and cylinder means, piston means in said reservoir, and means urging said piston means against the hydraulic fluid in said reservoir thereby permitting said reservoir to be positioned in a plurality of different attitudes.

5. An apparatus according to claim 1 and additionally comprising adjustable flow control means for controlling the rate of flow of fluid between said chamber and said main piston and cylinder assembly.

6. An apparatus according to claim 1 and additionally comprising means for adjusting said resilient means to provide a desired torque applying force to the rotor when said friction means is in said torque applying position.

7. A disc brake for applying a torque resisting force to a rotatable shaft having a disc brake rotor thereon comprising: rotation resisting friction means on each side of said rotor; means mounting each of said friction means for movement between a position engaging said rotor and a position disengaged from said rotor by a gap of predetermined size, resilient means operatively connected to said friction means to urge said friction means into torque resisting engagement with said rotor; hydraulic brake piston and cylinder means operatively connected to said friction means for moving said friction means to said disengaged position; a master cylinder including a cylinder wall defining a cylinder chamber, conduit means connecting said chamber to said brake cylinder, a plunger mounted for reciprocable movement in said master cylinder through a predetermined stroke, a fluid reservoir, passage defining means solely within said cylindrical wall communicating with said chamber when said plunger is in a fully extended brake engaging position; power means for moving said plunger in a fluid pumping stroke in said chamber from a fully extended to a retracted position to first block said passage thereby sealing said reservoir from said chamber and for thereafter pumping a predetermined volume of hydraulic fluid from said chamber into said brake cylinder for moving each of said friction means to said disengaged position spaced from the rotor by said gap.

8. An apparatus according to claim 7 wherein said power means comprises a solenoid, a lever connected to said solenoid and to said plunger, and fulcrum means for supporting said lever for pivotal movement, the cross-sectional area of said plunger being smaller than the cross-sectional area of said piston, said fulcrum means being disposed closer to said plunger than to said solenoid thereby reducing the force required by said solenoid to overcome the braking force of said resilient means.

9. In a brake system or the like, wear compensating apparatus for maintaining a predetermined gap between the planar friction surfaces of relatively movable friction elements when the elements are in their released position comprising; means for moving at least one of said elements relative to the other in a direction parallel to said planar surfaces; resilient means for normally urging said friction elements into engagement with each other for terminating said parallel relative movement between said friction elements; hydraulic piston and cylinder means operatively connected to said friction elements for overcoming said resilient means and moving said elements through said predetermined gap to said released position, said piston and cylinder means having a headspace which gradually reduces in volume in response to wear of said friction elements, power means for directing a predetermined volume of hydraulic fluid into said hydraulic piston and cylinder means during each movement of said friction element to said released position, said power means including a master cylinder having a cylinder wall defining a cylinder chamber and a plunger mounted for reciprocable movement in said cylinder chamber, a hydraulic reservoir, and passage defining means disposed solely within said cylinder walls, said power means also including means for moving said plunger between a position out of engagement with said passage defining means for receiving any excess hydraulic fluid from said diminishing headspace that is due to frictional wear of said elements and a position closing said conduit means and thereafter directing said predetermined volume of hydraulic fluid into said hydraulic piston and cylinder means for moving the elements to their released positions.

10. In a brake system or the like, wear compensating apparatus for maintaining a predetermined gap between the planar friction surfaces of relatively movable friction elements when the elements are in their released positions comprising; means for moving at least one of said elements relative to the other in a direction parallel to said planar surfaces; pressure applying means for normally urging said friction elements into engagement with each other for terminating said parallel relative movement between said friction elements, hydraulic piston and cylinder means operatively connected to said friction elements for overcoming said pressure applying means and moving said elements through said predetermined gap to said released position, said piston and cylinder means having a headspace which gradually reduces in volume in response to wear of said friction elements, means for directing a predetermined volume of hydraulic fluid into said hydraulic piston and cylinder means during each movement of said friction element to said released position, and reservoir means for receiving any excess hydraulic fluid from said diminishing headspace that is due to frictional wear of said elements prior to moving the elements to their released positions, piston means in said reservoir, and means urging said piston means against the hydraulic fluid in said reservoir thereby permitting said reservoir to be positioned in a plurality of different attitudes.

* * * * *

UNITED STATES PATENT OFFICE
CERTIFICATE OF CORRECTION

Patent No. 4,042,077            Dated August 16, 1977

Inventor(s) RICHARD H. MC CARTHY

It is certified that error appears in the above-identified patent and that said Letters Patent are hereby corrected as shown below:

Column 1, line 23   change "No. 3,63_,715" to "3,633,715".

Column 3, line 38   change "portin" to "portion".

Column 4, line 41   change "114" to "144".

Column 6, line 18   change "68ai" to "68a".

Signed and Sealed this

Seventh Day of February 1978

[SEAL]

Attest:

RUTH C. MASON  
Attesting Officer

LUTRELLE F. PARKER  
Acting Commissioner of Patents and Trademarks